(12) United States Patent
Kawai

(10) Patent No.: US 10,142,507 B2
(45) Date of Patent: Nov. 27, 2018

(54) INFORMATION PROCESSING APPARATUS AND NON-TRANSITORY COMPUTER READABLE RECORDING MEDIUM

(71) Applicant: KYOCERA DOCUMENT SOLUTIONS INC., Osaka (JP)

(72) Inventor: Takanao Kawai, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 15/471,680

(22) Filed: Mar. 28, 2017

(65) Prior Publication Data

US 2017/0289381 A1  Oct. 5, 2017

(30) Foreign Application Priority Data

Apr. 1, 2016 (JP) .................................. 2016-073973

(51) Int. Cl.
*H04N 1/00* (2006.01)

(52) U.S. Cl.
CPC ..... *H04N 1/00938* (2013.01); *H04N 1/00037* (2013.01); *H04N 1/00066* (2013.01); *H04N 1/00244* (2013.01); *H04N 1/00344* (2013.01); *H04N 2201/0094* (2013.01); *H04N 2201/0098* (2013.01)

(58) Field of Classification Search
CPC .................................................. H04N 1/00938
USPC ......................................................... 358/1.13
See application file for complete search history.

(56) References Cited

U.S. PATENT DOCUMENTS

| 2003/0233488 | A1 | 12/2003 | Ozaki et al. |
| 2011/0276960 | A1* | 11/2011 | Nakamoto ............... G06F 8/61 717/178 |
| 2014/0122576 | A1* | 5/2014 | Ohkuma ................. H04L 67/10 709/203 |

(Continued)

FOREIGN PATENT DOCUMENTS

| JP | 2004-021400 A | 1/2004 |
| JP | 2011-237881 A | 11/2011 |

(Continued)

OTHER PUBLICATIONS

Japan Patent Office, Office action dated Sep. 25, 2018 for corresponding JP Patent Application No. 2016-073973.

*Primary Examiner* — Jacky X Zheng
(74) *Attorney, Agent, or Firm* — Li & Cai Intellectual Property (USA) Office (57) ABSTRACT

An information processing apparatus includes: a management system that detects a user operation and acquires information input by the operation as data to be supplied to an electronic apparatus; and a setting system that supplies a first sub-module to the electronic apparatus, the electronic apparatus including one or more electronic apparatuses, the first sub-module being to be installed in each of the one or more electronic apparatuses to allow each of the one or more electronic apparatuses to execute a particular function, and executes a second sub-module to cause the management system to acquire setting data, the setting data being necessary for each of the one or more electronic apparatuses to execute the first sub-module, and to supply the setting data acquired by the management system to the one or more electronic apparatuses.

5 Claims, 6 Drawing Sheets (56) References Cited

U.S. PATENT DOCUMENTS

| 2015/0156351 | A1* | 6/2015 | Yamamoto | H04N 1/00347 |
| | | | | 358/1.15 |
| 2016/0286061 | A1* | 9/2016 | Saka | H04N 1/00501 |
| 2016/0337536 | A1* | 11/2016 | Han | H04N 1/00464 |

FOREIGN PATENT DOCUMENTS

| JP | 2014-048756 A | 3/2014 |
| JP | 2014-102816 A | 6/2014 |

\* cited by examiner

INFORMATION PROCESSING APPARATUS AND NON-TRANSITORY COMPUTER READABLE RECORDING MEDIUM

CROSS REFERENCE TO RELATED APPLICATION

This application claims the benefit of Japanese Priority Patent Application JP2016-073973 filed Apr. 1, 2016, the entire contents of which are incorporated herein by reference.

BACKGROUND OF THE INVENTION

1. Field of the Invention

The present disclosure relates to an information processing apparatus that supplies an electronic apparatus with a software module to be installed in the electronic apparatus to allow the electronic apparatus to execute a particular function and setting data necessary for the electronic apparatus to execute this software module, and a non-transitory computer readable recording medium that records a program. The present disclosure further relates to a non-transitory computer readable recording medium that records a software module including, as a sub-module, a software module to be installed in the electronic apparatus to allow the electronic apparatus to execute a particular function.

2. Description of Related Art

There is known a technology for automatically and appropriately delivering software to a plurality of electronic apparatuses (image processing apparatuses). Further, there is known a technology for assisting setting of a value depending on the user in an application program commonly used by a plurality of users.

It is desirable to, when installing software in a plurality of electronic apparatuses, make setting processing on the plurality of electronic apparatuses easier for a person who performs setting.

SUMMARY OF THE INVENTION

An information processing apparatus according to an embodiment of the present disclosure includes: a management system that detects a user operation and acquires information input by the operation as data to be supplied to an electronic apparatus; and a setting system that supplies a first sub-module to the electronic apparatus, the electronic apparatus including one or more electronic apparatuses, the first sub-module being to be installed in each of the one or more electronic apparatuses to allow each of the one or more electronic apparatuses to execute a particular function, and executes a second sub-module to cause the management system to acquire setting data, the setting data being necessary for each of the one or more electronic apparatuses to execute the first sub-module, and to supply the setting data acquired by the management system to the one or more electronic apparatuses.

A non-transitory computer readable recording medium according to an embodiment of the present disclosure records a program, the program causing a computer of an information processing apparatus to operate as: a management system that detects a user operation and acquires information input by the operation as data to be supplied to an electronic apparatus; and a setting system that communicates with the management system, in which the program causes the setting system to supply a first sub-module to the electronic apparatus, the electronic apparatus including one or more electronic apparatuses, the first sub-module being to be installed in each of the one or more electronic apparatuses to allow each of the one or more electronic apparatuses to execute a particular function, to cause the management system to acquire setting data, the setting data being necessary for each of the one or more electronic apparatuses to execute the first sub-module, and to supply the setting data acquired by the management system to the one or more electronic apparatuses.

A non-transitory computer readable recording medium according to an embodiment of the present disclosure records a software module executed by a computer of an information processing apparatus. The software module includes a first sub-module to be installed in an electronic apparatus to allow the electronic apparatus to execute a particular function, the electronic apparatus including one or more electronic apparatuses, and a second sub-module that causes a setting system of the information processing apparatus including a management system that detects a user operation and acquires information input by the operation as data to be supplied to the electronic apparatus, the setting system communicating with the management system, to cause the management system to acquire setting data, the setting data being necessary for each of the one or more electronic apparatuses to execute the first sub-module, and to supply the setting data acquired by the management system to the one or more electronic apparatuses.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

1. CONFIGURATION OF INFORMATION PROCESSING SYSTEM

Figure 1:
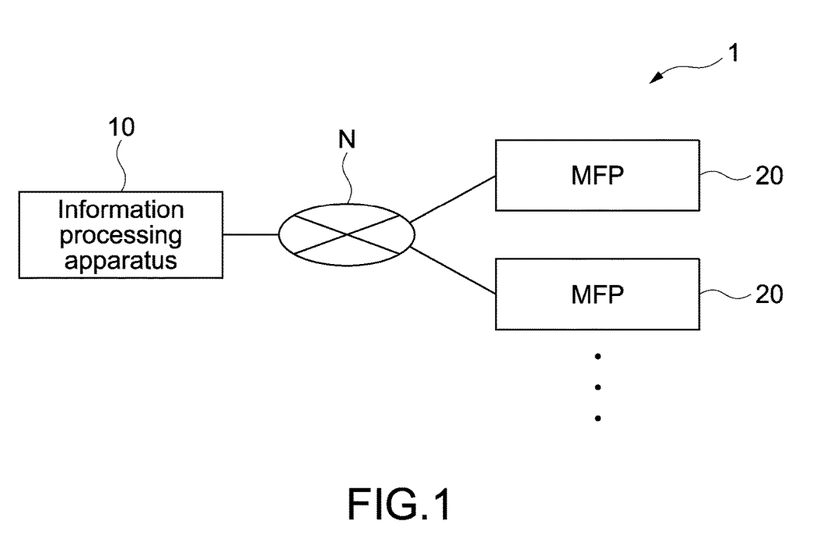
FIG. 1 schematically shows an information processing system according to an embodiment of the present disclosure.

FIG. 1 schematically shows an information processing system according to an embodiment of the present disclosure.

An information processing system 1 includes an information processing apparatus 10 and a plurality of image forming apparatuses (Multifunction Peripheral, hereinafter, referred to simply as MFP) (electronic apparatus) 20. Hereinafter, except when necessary, one MFP 20 will be described.

The information processing apparatus 10 exchanges information with the MFP 20 through bidirectional communication via a network N such as an in-office LAN (Local Area Network) or the Internet. The information processing apparatus 10 is used by an administrator of the MFP 20. The "administrator" is typically a person in charge of performing maintenance of the MFP 20 in the office or a serviceman of an MFP supplier.

Now, a typical usage condition of the information processing system 1 will be described. The information processing apparatus 10 supplies application software to the plurality of MFPs 20. Typically, the application software is one other than that normally installed in the MFP 20. More specifically, the application software is extension software supplied from a third vendor.

When extension software is additionally installed in the MFP 20, it is necessary to perform setting unique to the extended function on each of the MFPs 20 in some cases. In this case, the administrator needs to access each of the MFPs 20 in which the extension software is installed, open a setting screen, and manually input setting data piece by piece. In this method, management cost may be too much and it may take too much trouble where the number of the MFPs 20 on which setting is to be performed is large (e.g., when setting is performed on all the MFPs 20 in an office).

In view of the circumstances as described above, according to the information processing system 1 of the present embodiment, the information processing apparatus 10 operated by the administrator can collectively perform setting necessary to execute the extension software on the plurality of MFPs 20.

2. HARDWARE CONFIGURATION OF INFORMATION PROCESSING APPARATUS

Figure 2:
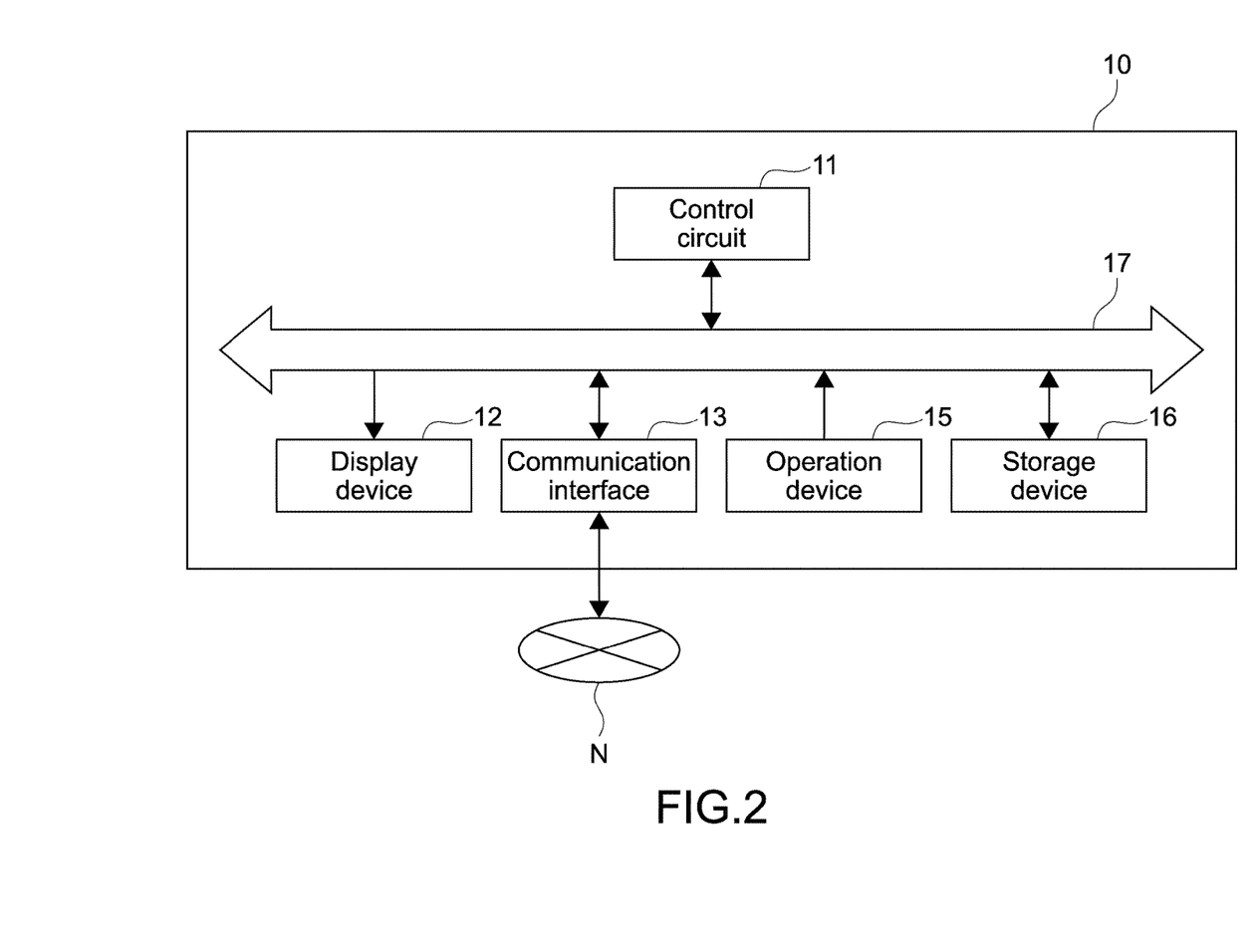
FIG. 2 shows a hardware configuration of an information processing apparatus.

FIG. 2 shows a hardware configuration of the information processing apparatus.

The information processing apparatus 10 includes a control circuit 11, and a display device 12, a communication interface 13, an operation device 15, and a storage device 16 that are connected to the control circuit 11 via a bus 17.

The control circuit 11 includes a CPU (Central Processing Unit) and the like. The control circuit 11 executes programs loaded to a RAM (Random Access Memory).

The storage device 16 includes a ROM (Read Only Memory), a RAM, and a large-volume storage device such as an HDD (Hard Disk Drive). The ROM fixedly stores programs to be executed by the control circuit 11, data, and the like. The programs stored in the ROM are loaded to the RAM. The large-volume storage device stores a database.

The display device 12 includes an LCD (Liquid Crystal Display), an organic EL (Electroluminescence) display, or the like. The display device 12 carries out operational processing based on information received from the control circuit 11 and displays generated image signals on a screen. Typically, the display device 12 is an external display device.

The operation device 15 includes a keyboard, a mouse, and various switches. The operation device 15 detects user operations and outputs operation signals to the control circuit 11.

The communication interface 13 is an interface used for connecting to the network N.

3. HARDWARE CONFIGURATION OF IMAGE FORMING APPARATUS

Figure 3:
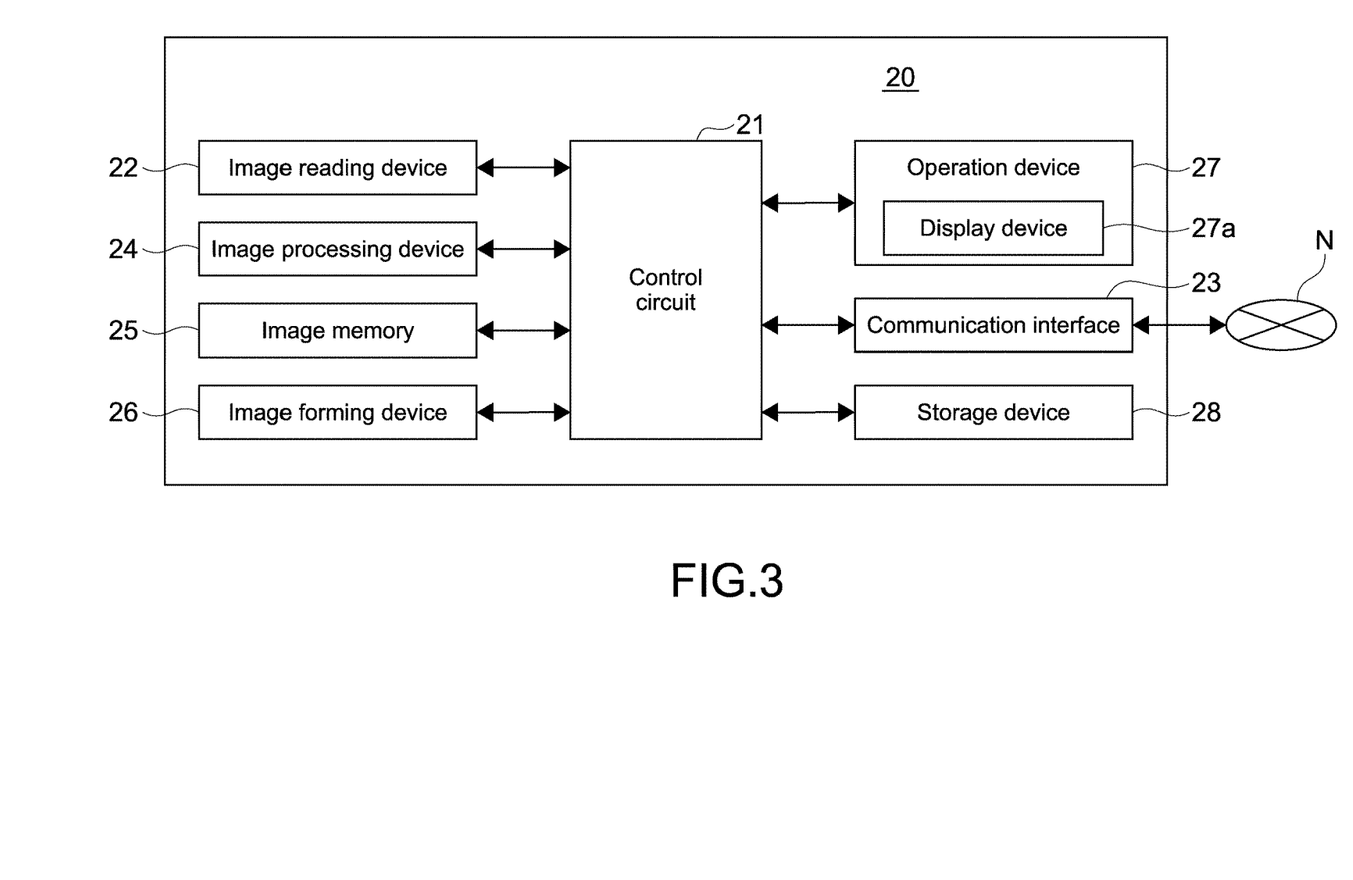
FIG. 3 shows a hardware configuration of an image forming apparatus.

FIG. 3 shows a hardware configuration of the image forming apparatus.

The MFP 20 includes a control circuit 21. The control circuit 21 includes a CPU (Central Processing Unit), a RAM (Random Access Memory), a ROM (Read Only Memory), dedicated hardware circuits, and the like and performs overall operational control of the MFP 20. A computer program that causes the MFP 20 to operate as the respective functional units (to be described later) is recorded in a non-transitory computer readable recording medium such as a ROM.

The control circuit 21 is connected to an image reading device 22, an image processing device 24, an image memory 25, an image forming device 26, an operation device 27, a storage device 28, a communication interface 23, and the like. The control circuit 21 performs operational control of the respective devices connected thereto and exchanges signals and data with those devices.

According to job execution instructions input by a user via the operation device 27 or a personal computer (not shown) connected to the network N, the control circuit 21 controls drive and processing of mechanisms requisite for executing operational control of functions such as a scanner function, a printing function, and a copy function.

The image reading device 22 reads an image from a script.

The image processing device 24 carries out image processing as necessary on image data of an image read by the image reading device 22. For example, the image processing device 24 carries out image processing such as shading correction for improving image quality after an image read by the image reading device 22 is formed.

The image memory 25 includes an area that temporarily stores data of a script image read by the image reading device 22 or data to be printed by the image forming device 26.

The image forming device 26 forms an image of image data and the like read by the image reading device 22.

The operation device 27 includes a touch panel device and an operation key device that accept user instructions on various operations and processing that can be executed by the MFP 20. The touch panel device includes a display device 27a such as an LCD (Liquid Crystal Display) equipped with a touch panel.

The communication interface 23 is an interface used for connecting to the network N.

The storage device 28 is a large-volume storage device such as an HDD (Hard Disk Drive) that stores a script image read by the image reading device 22, and the like.

4. FUNCTIONAL CONFIGURATION OF INFORMATION PROCESSING APPARATUS

Figure 4:
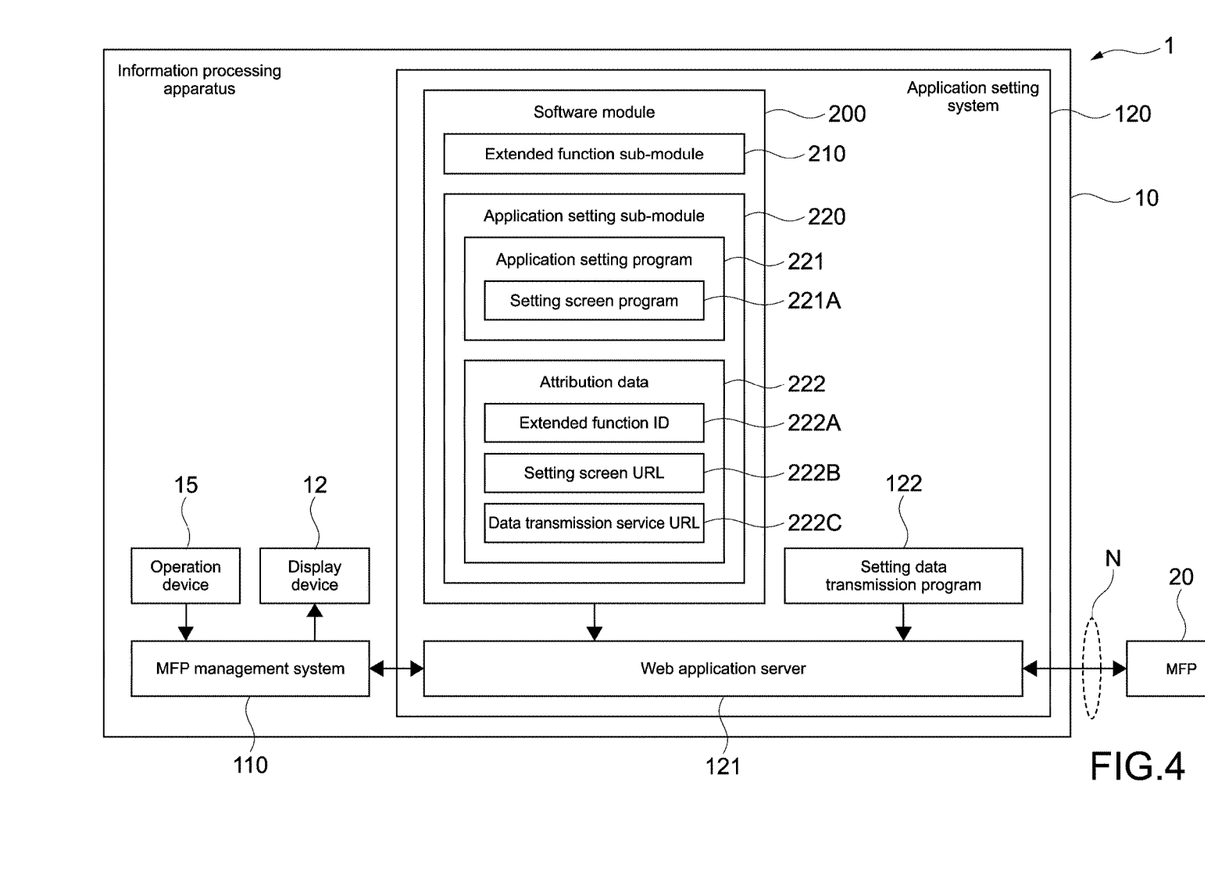
FIG. 4 shows a functional configuration of the information processing apparatus.

FIG. 4 shows a functional configuration of the information processing apparatus.

The information processing apparatus 10 includes an MFP management system 110 (management system) and an application setting system 120 (setting system). The MFP management system 110 (management system) and the application setting system 120 (setting system) can communicate with each other.

The MFP management system 110 is realized by the control circuit 11 of the information processing apparatus 10 executing an information processing program, and for managing the overall operation conditions (various kinds of setting, operation conditions, a remaining amount of toner, a remaining amount of paper, an extended function configuration, etc.) of the MFPs 20 via the communication interface 13 and the network N. Note that the configuration related to the overall management of the MFPs 20 by the MFP management system 110 via the network N is not shown because the configuration basically has no relation to the present disclosure. The MFP management system 110 can detect a user operation via the operation device 15 and acquiring information input by the operation, and output information to be provided to a user to the display device 12. Accordingly, the MFP management system 110 can act as a user interface.

The application setting system 120 is realized by the control circuit 11 of the information processing apparatus 10 executing an information processing program, and collectively performs setting necessary to execute particular extension software on the plurality of MFPs 20 via the communication interface 13 and the network N. More specifically, the application setting system 120 acquires setting data necessary to execute the extension software by using the MFP management system 110 via the operation device 15, and collectively supplies the acquired setting data to the plurality of MFPs 20 via the communication interface 13 and the network N. Hereinafter, the configuration of the application setting system 120 will be described in more detail.

The application setting system 120 includes a Web application server 121 and a setting data transmission program 122 therein. The setting data transmission program 122 is a Web application for transmitting setting data necessary to execute the extension software to the MFP 20 via the communication interface 13 and the network N. Upon activation of the application setting system 120, the application setting system 120 loads the setting data transmission program 122 into the Web application server 121, and executes the setting data transmission program 122.

The application setting system 120 loads a software module 200 recorded in the ROM that is an example of a non-transitory computer readable recording medium into the RAM, and executes the software module 200. The software module 200 includes an extended function sub-module 210 (first sub-module) and an application setting sub-module 220 (second sub-module).

The application setting system 120 supplies the extended function sub-module 210 to the plurality of MFPs 20 via the communication interface 13 and the network N. In other words, the extended function sub-module 210 is a program itself to be installed in the plurality of MFPs 20 to allow the plurality of MFPs 20 to execute a particular function.

The application setting sub-module 220 is implemented as, for example, a Web application. The application setting sub-module 220 includes an application setting program 221 that is a Web application program, and attribution data 222.

When the application setting system 120 loads the application setting sub-module 220, the application setting system 120 loads the application setting program 221 and the attribution data 222 into the Web application server 121.

The attribution data 222 includes an extended function ID 222A, a setting screen URL 222B, and a data transmission service URL 222C. The extended function ID 222A is an identifier uniquely assigned to each extended function. The setting screen URL 222B is a URL for displaying a setting screen. The "setting screen" is displayed on the display device 12, and is a user interface for a user to input setting data of an extended function via the operation device 15. The data transmission service URL 222C is a URL of data transmission service for the setting data transmission program 122 to accept setting data of each extended function and actually perform setting.

The application setting program 221 includes a setting screen program 221A. By executing the setting screen program 221A, the application setting system 120 accepts a request for the URL of the setting screen from the MFP management system 110, supplies the setting screen URL 222B to the MFP management system 110, and causes the display device 12 to display the setting screen.

Figure 5:
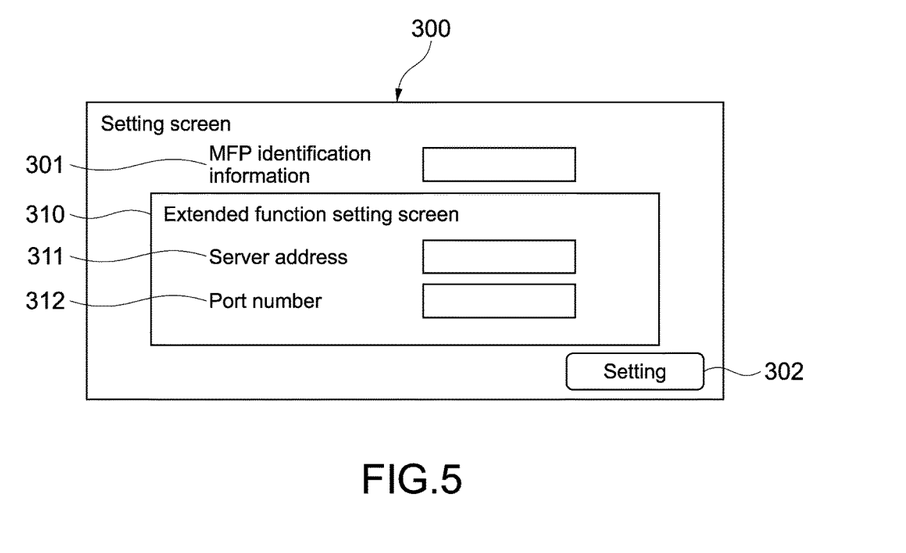
FIG. 5 schematically shows a setting screen.

FIG. 5 schematically shows the setting screen.

On a setting screen 300, MFP identification information 301, a setting button 302, and an extended function setting screen 310 are displayed.

The MFP identification information 301 indicates identification information of one or more MFPs 20 in which the extended function sub-module 210 is to be installed. In the input area on the right side of the "MFP identification information", information for identifying the one or more MFPs 20 in which the extended function sub-module 210 has been successfully installed can be displayed with, for example, a drop down list. The user can select the one or more MFPs 20 in which the extended function sub-module 210 is to be installed, from the displayed drop down list via the operation device 15.

The setting button 302 is used when the user inputs a setting command via the operation device 15.

The extended function setting screen 310 is an iframe (inline frame), and used when performing setting on setting data to be set in the MFP 20. As shown in FIG. 5, where an extended function is one that provides data transmission service, the extended function setting screen 310 is used when the user inputs a server address 311 that indicates the address of the service providing server and a port number 312 of the service via the operation device 15.

With reference to FIG. 4 again, the MFP management system 110 detects a particular user operation input in the operation device 15 as setting data to be set in the MFP 20, and supplies the detected setting data to the application setting program 221.

The application setting program 221 transmits the setting data acquired from the MFP management system 110 to the URL recorded in the setting data transmission program 122. The application setting program 221 transmits each piece of setting data in, for example, the HTTP POST data format.

The setting data transmission program 122 successively transmits the setting data acquired from the MFP management system 110 to the URL of the MFP 20. The URL of the MFP 20 is described as, for example, "https://[IP address of MFP]:[port number of service]/[URL of data transmission service]".

5. OPERATIONS OF INFORMATION PROCESSING APPARATUS

Figure 6:
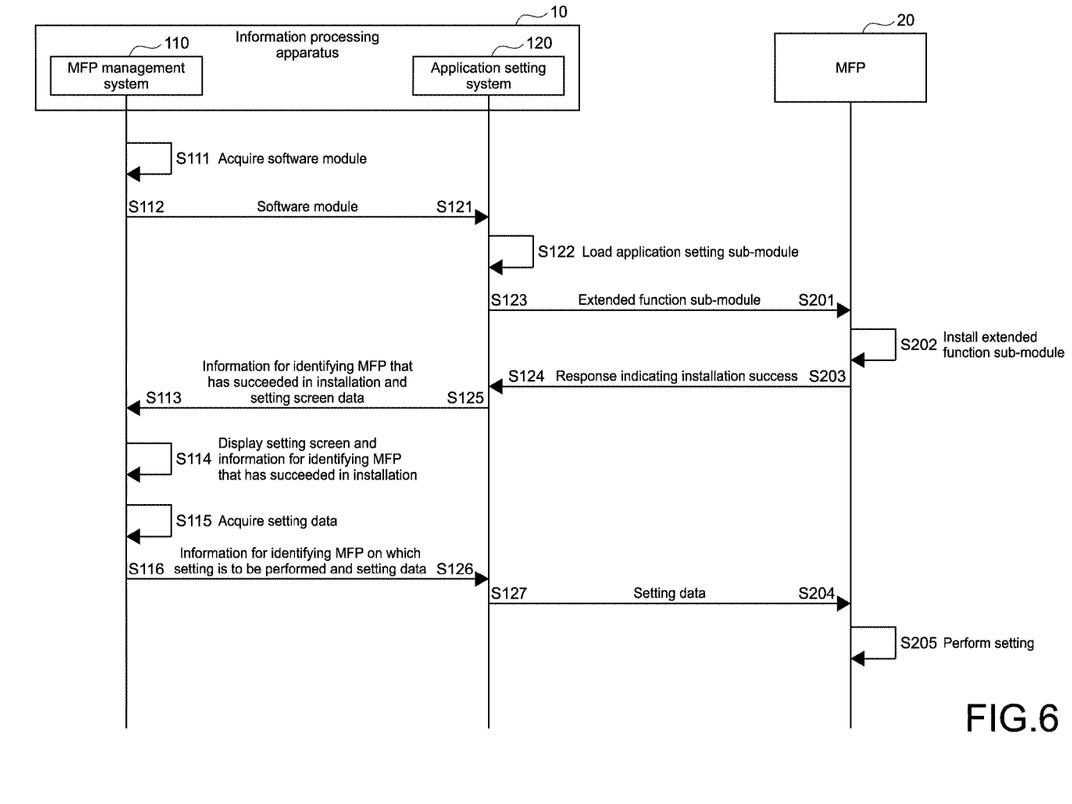
FIG. 6 shows an operational sequence of the information processing apparatus.

FIG. 6 shows an operational sequence of the information processing apparatus.

The MFP management system 110 of the information processing apparatus 10 acquires the software module 200 including the extended function sub-module 210 to be installed in the MFP 20 via the Internet or from a non-transitory computer readable recording medium such as a CD-ROM (Step S111). The MFP management system 110 supplies the acquired software module 200 to the application setting system 120 (Step S112).

The application setting system 120 of the information processing apparatus 10 acquires the software module 200 from the MFP management system 110 (Step S121). The application setting system 120 loads the application setting sub-module 220 from the acquired software module 200 into the application setting system 120 (Step S122). The application setting system 120 further loads the extended function sub-module 210 to be installed in the MFP 20 to allow the MFP 20 to execute a particular function, from the acquired software module 200. The application setting system 120 transmits the loaded extended function sub-module 210 to the MFP 20 (Step S123).

The MFP 20 receives the extended function sub-module 210 from the application setting system 120 of the information processing apparatus 10 (Step S201), and installs the extended function sub-module 210 (Step S202). When the MFP 20 has successfully installed the extended function sub-module 210, the MFP 20 transmits a response to the information processing apparatus 10 (Step S203). The response indicates that the extended function sub-module 210 has been successfully installed.

The application setting system 120 of the information processing apparatus 10 receives the response indicating that the extended function sub-module 210 has been successfully installed, from the MFP 20 (Step S124). The application setting system 120 executes the application setting sub-module 220. The application setting system 120 supplies information for identifying the MFP 20 that has successfully installed the extended function sub-module 210 and setting screen data acquired by executing the setting screen program 221A to the MFP management system 110 (Step S125).

The MFP management system 110 of the information processing apparatus 10 acquires the information for identifying the MFP 20 that has successfully installed the extended function sub-module 210 and the setting screen data from the application setting system 120 (Step S113). The MFP management system 110 generates a setting screen based on the acquired setting screen data, and displays the setting screen on the display device 12 (Step S114). The MFP management system 110 displays the information for identifying the MFP 20 that has successfully installed the extended function sub-module 210 on the setting screen.

The MFP management system 110 of the information processing apparatus 10 detects a particular user operation input in the operation device 15, and selects the MFP 20 to which setting data is to be supplied. The MFP management system 110 detects a particular user operation input in the operation device 15, and acquires information input by the operation as setting data to be supplied to the MFP 20 that has successfully installed the extended function sub-module 210 (Step S115). The MFP management system 110 supplies the information for identifying the MFP 20 to which the setting data is to be supplied and setting data for the MFP 20 to the application setting system 120 (Step S116).

The application setting system 120 of the information processing apparatus 10 acquires the information for identifying the MFP 20 to which setting data is to be supplied and setting data for the MFP 20 from the MFP management system 110 (Step S126). The application setting system 120 transmits the setting data to the MFP 20 corresponding to the acquired information for identifying the MFP 20 (Step S127).

The MFP 20 receives the setting data from the application setting system 120 of the information processing apparatus 10 (Step S204). The MFP 20 performs setting to allow the MFP 20 to execute the extended function sub-module 210 based on the setting data (Step S205).

6. CONCLUSION

There is a standard setup tool for setting of a function normally installed in an MFP, and it is possible to collectively perform setting on a plurality of MFPs. Meanwhile, in the case of a function other than the function normally installed in the MFP, particularly, an extended function developed by a manufacturer other than an MFP manufacturer, the setting processing specification is not uniform, and a setting tool that can collectively perform setting on a plurality of MFPs is not generally provided.

In this regard, according to the present embodiment, the software module 200 includes the extended function sub-module 210 to be installed in the one or more MFPs 20 to allow the one or more MFPs 20 to execute a particular function, and the application setting sub-module 220 for the application setting system 120 of the information processing apparatus 10 to supply setting data to the MFP 20. Accordingly, by executing the software module 200, the information processing apparatus 10 can collectively supply the extended function sub-module 210 itself to the plurality of MFPs 20 and collectively supplying setting data to the plurality of MFPs 20.

Further, according to the present embodiment, the application setting system 120 of the information processing apparatus 10 selects the MFP 20 on which setting is to be performed or acquires setting data via the MFP management system 110 as a user interface, and supplies the setting data to the MFP 20 on which setting is to be performed. Accordingly, it is possible for a user to operate the MFP management system 110 and add an extended function to the MFPs 20, as if managing the overall operation conditions of the MFPs 20.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a management system that detects a user operation and acquires information input by the operation as setting data to be supplied to an electronic apparatus; and
a setting system that
acquires a software module including a first sub-module and a second sub-module,
collectively supplies the first sub-module included in the acquired software module to a plurality of electronic apparatuses, the first sub-module being to be installed in each of the plurality of electronic apparatuses to allow each of the plurality of electronic apparatuses to execute a particular function,
acquires a response from each of electronic apparatuses, that have successfully installed the first sub-module, out of the plurality of electronic apparatuses to which the first sub-module is supplied, the response indicating that the first sub-module has been successfully installed, and
executes the second sub-module included in the acquired software module
to cause the management system to acquire the setting data, the setting data being necessary for each of the electronic apparatuses to execute the first sub-module, and to collectively supply the setting data acquired by the management system to the electronic apparatuses, that have successfully installed the first sub-module.

2. The information processing apparatus according to claim 1, wherein
the setting system causes the management system
to detect a particular user operation, and
to acquire the setting data to be supplied to the electronic apparatus that has successfully installed the first sub-module.

3. The information processing apparatus according to claim 1, wherein
the setting system
supplies information for identifying the electronic apparatus that has successfully installed the first sub-module to the management system,
causes the management system
to detect a particular user operation, and
to select information for identifying the electronic apparatus to which the setting data is to be supplied, of the electronic apparatus that has successfully installed the first sub-module, and
supplies the setting data to the electronic apparatus corresponding to the information for identifying the electronic apparatus selected by the management system.

4. The information processing apparatus according to claim 1, wherein
a function executed by the electronic apparatus by installing the first sub-module includes a function other than a function normally installed in the electronic apparatus.

5. A non-transitory computer readable recording medium that records a program, the program causing a computer of an information processing apparatus to operate as:
a management system that detects a user operation and acquires information input by the operation as setting data to be supplied to an electronic apparatus; and
a setting system that communicates with the management system, wherein
the program causes the setting system
to acquire a software module including a first sub-module and a second sub-module,
to collectively supply the first sub-module included in the acquired software module to a plurality of electronic apparatuses, the first sub-module being to be installed in each of the plurality of electronic apparatuses to allow each of the plurality of electronic apparatuses to execute a particular function,
to acquire a response from each of electronic apparatuses, that have successfully installed the first sub-module, out of the plurality of electronic apparatuses to which the first sub-module is supplied, the response indicating that the first sub-module has been successfully installed, and
to execute the second sub-module included in the acquired software module
to cause the management system to acquire the setting data, the setting data being necessary for each of the electronic apparatuses to execute the first sub-module, and
to collectively supply the setting data acquired by the management system to the electronic apparatuses, that have successfully installed the first sub-module.

* * * * *